US008266670B1

(12) United States Patent
Merkow et al.

(10) Patent No.: US 8,266,670 B1
(45) Date of Patent: Sep. 11, 2012

(54) SYSTEM AND METHOD FOR DYNAMIC SECURITY PROVISIONING OF DATA RESOURCES

(75) Inventors: Mark Merkow, Tempe, AZ (US); James F. Petrone, Carefree, AZ (US)

(73) Assignee: American Express Travel Related Services Company, Inc., New York, NY (US)

( * ) Notice: Subject to any disclaimer, the term of this patent is extended or adjusted under 35 U.S.C. 154(b) by 1281 days.

(21) Appl. No.: 10/905,118

(22) Filed: Dec. 16, 2004

Related U.S. Application Data

(63) Continuation-in-part of application No. 10/711,433, filed on Sep. 17, 2004.

(60) Provisional application No. 60/626,254, filed on Nov. 8, 2004, provisional application No. 60/521,498, filed on May 6, 2004.

(51) Int. Cl.
*G06F 15/173* (2006.01)
*G06F 15/16* (2006.01)
*G06F 7/04* (2006.01)

(52) U.S. Cl. ........... 726/1; 726/24; 726/27; 713/189; 713/193; 713/375; 709/201; 709/220; 709/223; 709/224; 709/226; 709/229

(58) Field of Classification Search ............ 726/1
See application file for complete search history.

(56) References Cited

U.S. PATENT DOCUMENTS

| 6,014,651 | A * | 1/2000 | Crawford | 705/400 |
|---|---|---|---|---|
| 6,578,147 | B1 * | 6/2003 | Shanklin et al. | 726/22 |
| 6,799,216 | B2 * | 9/2004 | Steegmans | 709/228 |
| 6,985,955 | B2 * | 1/2006 | Gullotta et al. | 709/229 |
| 7,003,560 | B1 | 2/2006 | Mullen et al. | |
| 7,039,701 | B2 * | 5/2006 | Wesley | 709/224 |
| 7,131,140 | B1 * | 10/2006 | O'Rourke et al. | 726/11 |
| 7,464,118 | B2 * | 12/2008 | Ashok et al. | 1/1 |
| 7,831,693 | B2 * | 11/2010 | Lai | 709/220 |
| 7,930,215 | B2 * | 4/2011 | Pombo et al. | 705/26.1 |
| 2001/0049793 | A1 * | 12/2001 | Sugimoto | 713/200 |
| 2002/0032797 | A1 * | 3/2002 | Xu | 709/238 |
| 2002/0064149 | A1 * | 5/2002 | Elliott et al. | 370/352 |
| 2002/0144106 | A1 * | 10/2002 | Enomoto | 713/100 |
| 2002/0161904 | A1 * | 10/2002 | Tredoux et al. | 709/229 |
| 2002/0174227 | A1 * | 11/2002 | Hartsell et al. | 709/226 |
| 2002/0194350 | A1 | 12/2002 | Lu et al. | |
| 2003/0009540 | A1 * | 1/2003 | Benfield et al. | 709/220 |

(Continued)

OTHER PUBLICATIONS

Salchow, K., Jr., 'Load Balancing 101: The Evolution to Application Delivery Controllers', F5 Networks, Inc., Jul. 2007, entire document, http://www.f5.com/pdf/white-papers/evolution-adc-wp.pdf.*

(Continued)

*Primary Examiner* — Edan Orgad
*Assistant Examiner* — Ronald Baum
(74) *Attorney, Agent, or Firm* — Snell & Wilmer L.L.P.

(57) ABSTRACT

The present invention facilitates the dynamic provisioning of data assets in a shared storage environment. The invention provides a system and method for dynamically provisioning and de-provisioning shared storage resources based on multi-dimensional decision criteria. By employing specialized computing components configured to assess a data asset and requestor of a data asset, a provisioning engine is able to transform the input from the computing components into a specific configuration of shared storage resource provisioning and security controls. According to the rules and policies applying to a security domain, the provisioning engine may dynamically allocate shared storage resources in a manner that is both safe and efficient for the data asset.

18 Claims, 4 Drawing Sheets

U.S. PATENT DOCUMENTS

| | | | |
|---|---|---|---|
| 2003/0055994 A1* | 3/2003 | Herrmann et al. | 709/229 |
| 2003/0145093 A1* | 7/2003 | Oren et al. | 709/229 |
| 2003/0187794 A1 | 10/2003 | Irwin et al. | |
| 2003/0195942 A1 | 10/2003 | Muhlestein et al. | |
| 2004/0078600 A1 | 4/2004 | Nilsen et al. | |
| 2004/0158741 A1* | 8/2004 | Schneider | 713/201 |
| 2004/0165605 A1* | 8/2004 | Nassar | 370/401 |
| 2004/0260947 A1* | 12/2004 | Brady et al. | 713/201 |
| 2005/0010671 A1* | 1/2005 | Grannan | 709/229 |
| 2005/0043961 A1* | 2/2005 | Torres et al. | 705/1 |
| 2005/0044197 A1 | 2/2005 | Lai | |
| 2005/0050337 A1* | 3/2005 | Liang et al. | 713/188 |
| 2005/0050338 A1* | 3/2005 | Liang et al. | 713/188 |
| 2005/0177635 A1 | 8/2005 | Schmidt et al. | |
| 2006/0168253 A1* | 7/2006 | Baba et al. | 709/229 |

OTHER PUBLICATIONS

Non-Final Office Action mailed on Dec. 23, 2009 for U.S. Appl. No. 10/711,433.

USPTO; Office Action dated Oct. 18, 2007 in U.S. Appl. No. 10/711,433.

USPTO; Final Office Action dated May 13, 2008 in U.S. Appl. No. 10/711,433.

USPTO; Advisory Action dated Aug. 18, 2008 in U.S. Appl. No. 10/711,433.

USPTO; Office Action dated Nov. 28, 2008 in U.S. Appl. No. 10/711,433.

USPTO; Final Office Action dated May 27, 2009 in U.S. Appl. No. 10/711,433.

USPTO; Advisory Action dated Sep. 16, 2009 in U.S. Appl. No. 10/711,433.

USPTO; Notice of Allowance dated Jun. 28, 2010 in U.S. Appl. No. 10/711,433.

USPTO; Office Action dated Apr. 5, 2011 in U.S. Appl. No. 12/890,562.

USPTO; Notice of Allowance dated Oct. 28, 2011 in U.S. Appl. No. 12/890,562.

USPTO; Notice of Allowance dated Feb. 23, 2012 in U.S. Appl. No. 13/342,398.

* cited by examiner

SYSTEM AND METHOD FOR DYNAMIC SECURITY PROVISIONING OF DATA RESOURCES

CROSS-REFERENCE TO RELATED APPLICATIONS

This application is a continuation-in-part of U.S. Ser. No. 10/711,433 filed Sep. 17, 2004 and entitled "System and Method for Dynamic Security Provisioning of Computing Resources", which itself claims priority to U.S. Provisional Application Ser. No. 60/521,498 filed May 6, 2004 and entitled "System and Method for Dynamic Security Provisioning in a Commodity Computing Environment"; this application also claims priority to U.S. Provisional Application Ser. No. 60/626,254 filed Nov. 8, 2004 and entitled "System and Method for Dynamic Security Provisioning in a Shared Storage Environment", all of which are hereby incorporated by reference.

FIELD OF INVENTION

The present invention generally relates to provisioning and de-provisioning of computing and data resources for an asset within a commodity computing environment, and more particularly, to a system and method for dynamic provisioning of computing and data resources for assets through a multi-dimensional decisioning process including asset classification, asset business value and requesting entity.

BACKGROUND OF INVENTION

In enterprise computing environments where computing resources may be shared between any number of applications, processes, data transactions, etc., the classic problem that frequently arises is how to allocate limited computing resources to various requesting entities which may include, for example, a person, an application, a process, a server and the like. In recent years, this problem has become more manageable with the development of higher power processors and multi-processor computing environments with load-balancing capabilities. However, in high traffic computing environments, maintaining an adequate level of computing resources to adequately manage periods of high volume demand can often be costly. Further, adding additional computing resources is often not cost effective as it may result in extended periods where resources are not sufficiently employed. For example, while all computing resources may be employed during periods of high-traffic which represents 23% of total computing time, many of those assets may be unused for the remaining 77% of total computing time. Efforts, such as load balancing, has resulted in some alleviation of the problems associated with limited resources during high demand, however other problems still exist.

Load balancing is a process by which a load (number of requests, number of users, etc.) is spread throughout a network of servers and other devices in order to prevent individual devices from becoming overwhelmed by traffic, which may cause it to fail or to process the traffic more slowly. Load balancing may also be employed to redirect traffic in the event of a server or device failure thereby providing a level of fault tolerance. While load balancing is effective in managing computing resources in accordance with varying traffic levels, the technology is generally unconcerned with the nature of the traffic itself. In other words, load balancing utilities, as employed within most enterprises, do not apply security controls to computing assets beyond a one-dimensional decision point which is typically data classification.

Therefore, a need exists for a system and method for application of security controls and dynamic provisioning of computing resources that takes into account multi-dimensional decision criteria based on asset classification, business value and resource classification for a requesting entity. Further, there is a need for a system and method for data classification to more effectively manage data resources within a Shared Storage Area Network (SAN) or Network Attached Storage (NAS) environment.

SUMMARY OF INVENTION

The invention provides for dynamic security provisioning within a commodity data storage environment. The invention implements multi-dimensional decision criteria to assign an asset to an appropriate security domain or a set of predefined security controls (i.e. connection enforcement tools, encryption devices, intrusion detection devices, intrusion prevention devices, etc.). In general, the invention determines a classification for an asset, determines a business value for the asset and/or determines a resource classification for the requesting entity. A first dimension may describe a classification for data, system, application, process and hardware assets. For example, a classification may be labeled public, business confidential, private, or secret. A second dimension may provide a business' value assessment of an asset such as, for example, low, medium or high. A third dimension may provide a resource classification of the entity attempting to access the asset. Such asset classifications may include, for example, a label of "trusted" for internal entities or "non-trusted" for external entities. The multi-dimensional decisioning factor may create a set of security domains where assets may be placed; each comprising varying degrees of security controls.

A security domain effects how computing and data resources will be provisioned or de-provisioned in response to a security domain's asset. In a commodity computing environment, a security domain indicative of classification and value indices of an asset enables logic to be applied dictating what types of resources will be allocated to the asset and at what level. Assets residing in a security domain that is considered to be critical, will be afforded prioritized provisioning over assets residing in a non-critical security domain. Further, the security domain may define how an asset is to be handled. For example, if the classification of a requesting entity is "un-trusted", then an asset may be placed in a security domain requiring additional authentication of the requesting entity and/or device compliance checks (i.e. anti-virus software present and up-to-date, firewall installed and operating, etc.).

A provisioning engine may define a provisioning configuration for an asset through inputs from a variety of manager components. The manager components may have very specialized functionality and may include, for example, a connection manager, policy manager, configuration manager, risk manager, recovery manager, etc. Policies regarding a security domain may be processed by the provisioning engine which then transmits instructions to a provisioning tool which configures system resources for the storage asset. Further, to ensure that system resources are not unnecessarily reserved, the provisioning engine may send instructions to a provisioning tool to de-provision system resources when they are no longer needed by the storage environment asset or following a defined period of time or a predefined date when the stored data value is no longer deemed "secret", "private", or "confidential".

More particularly, the invention includes a computer implemented method for dynamically provisioning computing and data resources. The method may include, for example, determining an asset classification, receiving a request for computing resources, wherein the request is associated with an asset, business value and/or resource classification related to the asset; and, provisioning the computing resources based on the determining step. Based on multi-dimensional decision criteria, the invention may also place assets in at least one of a plurality of security domains based on the determining step, wherein each security domain includes a different degree of security controls. The invention may then further provision computing and data resources based upon the security domain placement.

BRIEF DESCRIPTION OF THE DRAWINGS

A more complete understanding of the present invention may be derived by referring to the detailed description and claims when considered in connection with the Figures, wherein like reference numbers refer to similar elements throughout the Figures, and:

DETAILED DESCRIPTION

The detailed description of exemplary embodiments herein makes reference to the accompanying drawings, which show the exemplary embodiment by way of illustration and its best mode. While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation.

In general, the invention includes a system and method for dynamic provisioning of data resources. The invention may be applicable within a Storage Area Network (SAN), a Network Attached Network (NAS), or any other data environment based on a commodity computing environment or any other traditional data environment (e.g. a UNIX File System). Through connections with various management utilities 135, the provisioning engine 130 may consider multiple levels of indices relating to a data asset to ensure proper and efficient database allocation while maintaining data integrity. Based on a data asset's security domain, a provisioning engine 130 may define baseline security requirements, dictate what level of resources the data asset will be afforded and interface with a system management tool 145 to provision and de-provision database resources.

Figure 1:
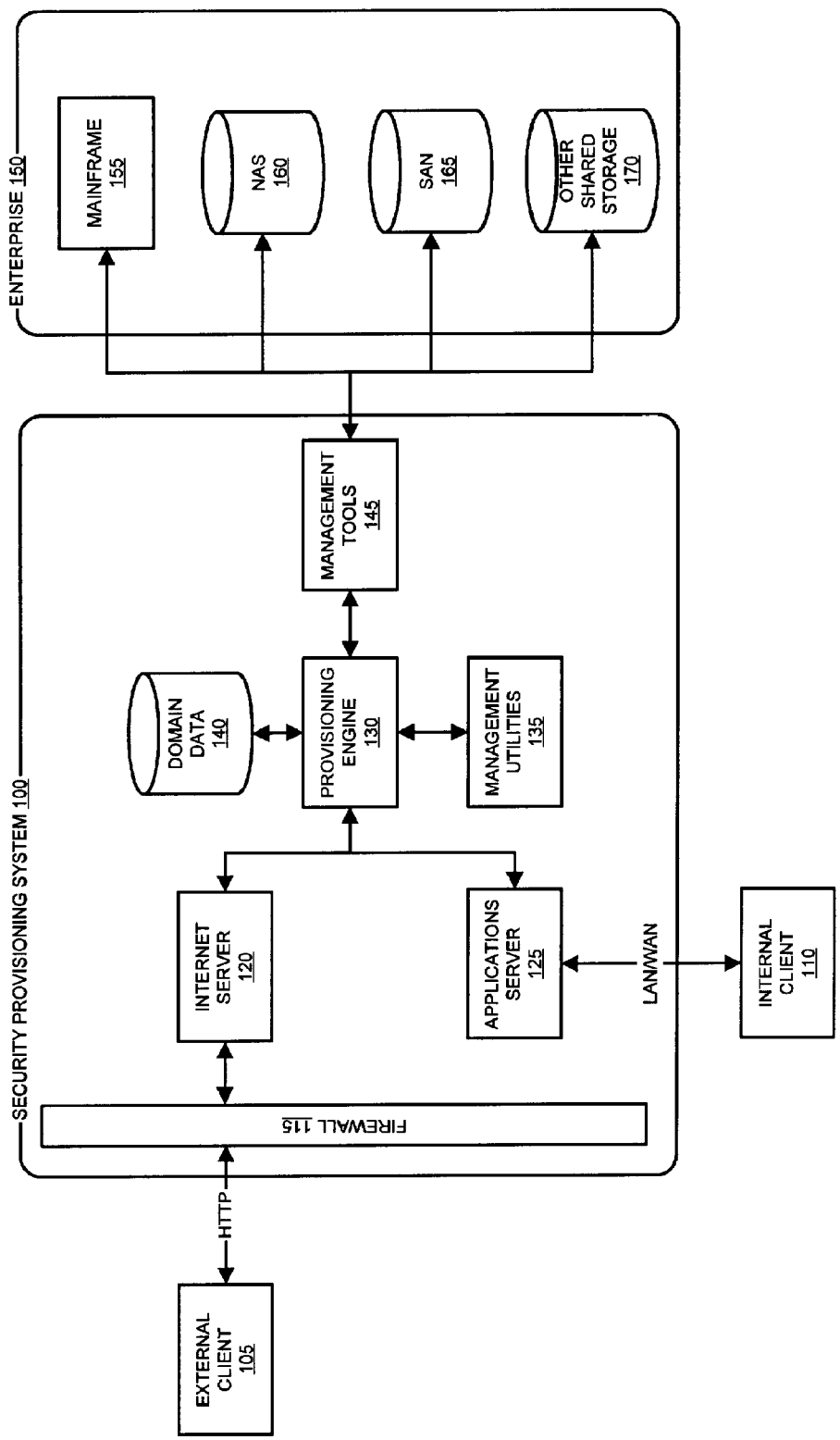
FIG. 1 is a block diagram illustrating exemplary major system components for asset based provisioning in a commodity computing environment.

The security provisioning system 100 contains various hardware and/or software components suitably configured to perform analysis of incoming data asset requests and attributes. Security provisioning system 100 may apply appropriate security controls and provision database resources accordingly. In one embodiment, with reference to FIG. 1, security provisioning system 100 includes a firewall 115, an Internet server 120, an applications server 125, provisioning engine 130, management utilities 135, domain database 140 and management tools 145. External entities may include an external client 105 (e.g., Internet client) and an internal client 110 (e.g., a Local Area Network (LAN) or Wide Area Network (WAN) client). The security provisioning system 100 may interface with any number of computing devices and data in one or more enterprise 150. An enterprise 150 may comprise any number of mainframe networks 155, NAS 160 and SAN 165 or any other shared storage media devices 170. Practitioners will appreciate that the invention may be applied within any number of networks in any number of configurations, and therefore is not limited to the configuration as illustrated in FIG. 1.

As will be appreciated by one of ordinary skill in the art, the invention may be embodied as a customization of an existing system, an add-on product, upgraded software, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

Referring again to FIG. 1, an external client 105 may include any individual, business, entity, software and/or hardware that utilizes applications and or data within an enterprise 150. For example, an external client 105 may take the form of a bank customer who connects to a bank's website in order to conduct bill payment and transfer transactions. Such transactions may comprise requests for various enterprise system 150 computing assets such as, for example, applications, processes and data. The manner in which requested assets will be provisioned may have been determined by the classifications of the assets according to multi-dimensional decision criteria. An external client 105 may be equipped with an Internet browser connected to the Internet using standard dial-up, cable, DSL or any other Internet protocol known in the art. Transactions originating at an external client 105 may need to pass through a firewall 115 in order to prevent unauthorized access from other networks. Further, the provisioning engine may manage external client 105 connections by invoking a firewall 115 or allowing direct access to an Internet server 120.

A firewall 115 may include any hardware and/or software suitably configured to protect security provisioning system 100 components and/or enterprise computing resources from users of other networks. Further, a firewall may be configured to limit or restrict access to various systems and components behind the firewall 115 for external clients 105 connecting through an Internet server 120. Firewall 115 may reside in varying configurations including Stateful Inspection, Proxy based and Packet Filtering among others. Firewall 115 may be integrated within an Internet server 120 or any other security provisioning system 100 components or may further reside as a separate entity.

An external client 105 and an internal client 110 may be equipped with computing units or systems which may take the form of a computer or set of computers, although other types of computing units or systems may be used, including laptops, notebooks, hand held computers, set-top boxes, workstations, computer-servers, main frame computers, mini-computers, PC servers, network sets of computers, and/or the like. Further, any computing device discussed herein may also be a "pervasive computing device," which may include a traditionally non-computerized device that is embedded with a computing unit. Examples can include, for example, watches, Internet enabled kitchen appliances, restaurant tables embedded with RF readers, wallets or purses with imbedded transponders, etc.

In one embodiment, an internal client 110 may be an administrator or manager of the provisioning system 100 and/or enterprise 150. The internal client 110 may interface with the provisioning system 100 to configure management utilities 135, define classification rules, override provisioning engine 130, monitor processes and the like.

An Internet server 120 may include any hardware and/or software suitably configured to serve web pages and data to a connected external client 105. The Internet server 120 may communicate with any number of other servers, databases or components through any means known in the art. The Internet server 120 may serve as a conduit between an external client 105 and the systems and components of the security provisioning system 100 and the enterprise 150. Internet server 120 may interface with the provisioning engine 130 where requests for assets may invoke a provisioning process.

An asset, as used herein, may include any hardware, software and/or data components which perform general and/or specific functions within an enterprise computing environment. An asset may be a component that is shared between any number of users and/or other computing assets. An asset may comprise hardware components (e.g., computer memory, processors), software components (e.g. computer programs, code components, processes) and/or data components (e.g., databases, tables, records, queries). Like tangible assets such as, for example, office furniture and supplies, computing assets may be assigned values according to the importance of their utility. Further, the usability of an asset may be directly related to the availability of computing resources to process the asset. In a SAN 165 and/or NAS 160 data environment, the data layer is independent from the servers and applications within a network, therefore data assets may be provisioned independently of other computing resources. A more complete description of SAN 165 and NAS 160 follows.

Both SAN 165 and NAS 160 data architectures allow data services to be offloaded from servers and consolidated within their own independent platform. SAN 165, is a high-speed sub-network of shared storage devices. The storage device may comprise nothing but a disk or disks for storing data. SAN 165 architecture works in a way that makes all storage devices available to all servers on a network. As more storage devices are added to SAN 165, they may be accessible from any server in the network and the server acts as a pathway between the end user and the stored data. Because stored data does not reside directly on any of a network's servers or mainframes, processing power is utilized for business applications, and network capacity is released to the end user.

NAS 160 is similar to SAN 165 in its concept, but is more applicable to data in the form of files, rather than databases. Under the NAS 160 architecture, files are offloaded from application servers and relocated to storage within its own independent platform. The consolidation of storage resources provides simplified management and scalability within an enterprise.

An applications server 125 may include any hardware and/or software suitably configured to serve applications and data to a connected internal client 110. Like the Internet server 120, the applications server 125 may communicate with any number of other servers, databases and/or components through any means known in the art. Further, the applications server 125 may serve as a conduit between an internal client 110 and the systems and components of the security provisioning system 100 and the enterprise 150. Internal clients 110 may interface with an applications server 125 through any means known in the art including a LAN/WAN, for example.

As used herein, Internet Server 120 and applications server 125 may be used interchangeably to illustrate a connection point for both internal clients 110 and external clients 105. While an Internet server 120 may not be necessary for internal clients 110 to interface with the various systems and components of the security provisioning system 100 and the enterprise 150, it is shown in FIG. 1 to demonstrate an alternative system and method for accessing the utility of the invention. Practitioners will appreciate that there may be any number of architectures and configurations, including hardware, software and networking protocols, for interfacing with enterprise 150 resources.

The provisioning engine 130 may include any hardware and/or software suitably configured to receive inputs from one or more manager components and transmit instructions to management tools 145 regarding provisioning and de-provisioning of enterprise 150 computing resources. The provisioning engine 130 may reside as a software entity within an Internet server 120 or applications server 125. The provisioning engine 130 may also reside as a stand-alone system within the security provisioning system 100. Provisioning engine 130 may receive requests for assets from an Internet server 120 or applications server 125. Based on such requests, the provisioning engine 130 may solicit inputs from a number of management utilities 135 regarding provisioning rules based on the asset's security. In one embodiment, a provisioning engine 130 may request data from a domain database 140 which may maintain security domain definitions and policies.

Domain database 140 may include any hardware and/or software suitably configured to facilitate storing security domain information relating to various security tiers and used to maintain security domain definitions and policies relating to the domains. One skilled in the art will appreciate that the security provisioning system 100 may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. In this regard, the data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); binary large object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a binary large object (BLOB). Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first issuer, a second data set which may be stored may be provided by an unrelated second issuer, and yet a third data set which may be stored, may be provided by an third issuer unrelated to the first and second issuer. Each of these three exemplary data sets may contain different information that is stored using different data storage formats and/or techniques. Further, each data set may contain subsets of data which also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, provider, issuer, user or the like. Furthermore, the security information may restrict/permit only certain actions such as accessing, modifying, and/or deleting data sets. In one example, the data set annotation indicates that only the data set owner or the user are permitted to delete a data set, various identified providers are permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The present invention may contemplate a data storage arrangement wherein the header or trailer, or header or trailer history, of the data is stored on the transaction instrument in relation to the appropriate data.

Management utilities 135 may include any hardware and/or software suitably configured to manage and enforce business rules and policies relating to access to assets and provisioning of computing resources. Management utilities 135 may comprise various components with specific functionality such as, for example, a policy manager, connection enforcement manager, risk manager, configuration manager, recovery manager, etc. While illustrated as a single component in FIG. 1, management utilities 135 may be deployed as individual components residing on a single server or computing unit, or may reside within any number of computing components and/or devices. When the provisioning engine 130 receives an asset request from an Internet server 120 or server 125, it may invoke one or more management utilities 135 in order retrieve policy information which may be used to define a provisioning configuration. Based on input from the one or more management utilities 135, the provisioning engine may create a security domain for the asset in order to safely and efficiently provision computing resources and grant access to the requested asset. A more detailed description of the exemplary management utilities 135 will be provided herein.

Management tools 145 may include any hardware and/or software suitably configured to manage memory and processor allocation in response to instructions provided by the provisioning engine 130. Those skilled in the art will appreciate that there are a number of methods known in the art for dynamically managing computing resources including solutions which are commercially available such Tivoli™ by IBM®. Such management tools may vary in sophistication and be configured for any number of computing architectures and operating systems. The provisioning engine 130 may interface with management tools 145 in order to provide instructions regarding resource provisioning and de-provisioning for computing systems residing in the enterprise 150.

An enterprise 150 may include any hardware and/or software suitably configured to carry out computing operations for a business, government entity or organization. As used herein, the enterprise 150 is used to describe one or more computing systems, which may include servers, databases, mainframes, printers and the like. An enterprise 150 may provide access to varying levels applications and data to internal clients 110, external clients 105 as well as to any other computing device and/or component. Various computing systems within the enterprise 150 may be invoked in response to a request for application and data processing. This request may come from another enterprise 150 component, a security provisioning system 100 component or a combination thereof. However, in most cases, the request will have originated from a user, such as the external client 105 or internal client 110.

Figure 2:
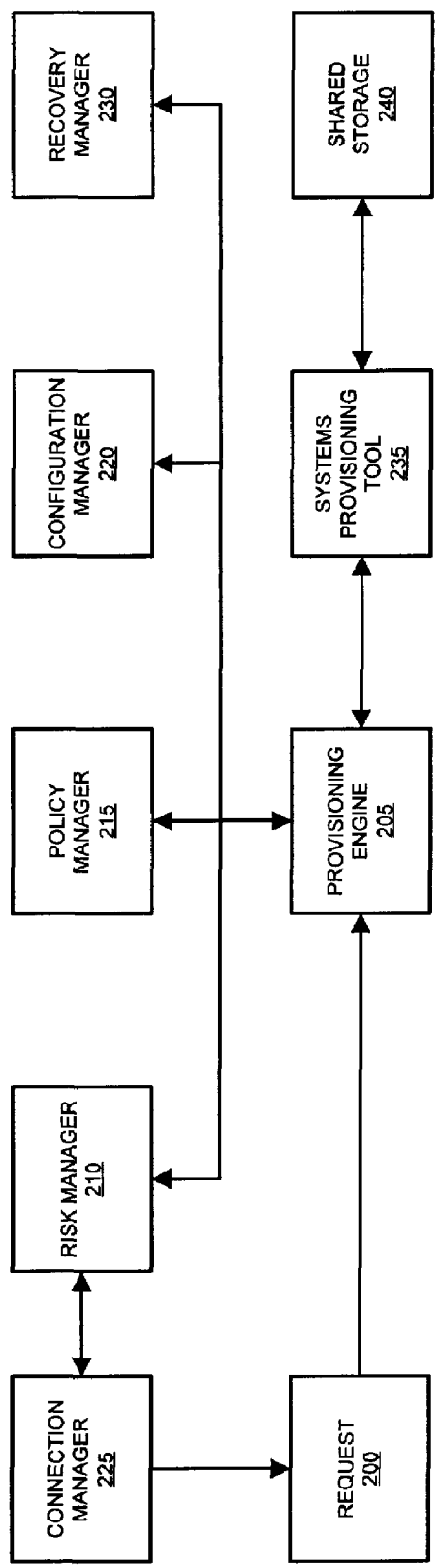
FIG. 2 is a block diagram illustrating an exemplary relationship between a provisioning engine and various resource management components.

FIG. 2 is a block diagram illustrating the relationship between an exemplary provisioning engine of the invention and various resource manager components. Block 200 represents a request for an asset which may originate from an external client 100 or internal client 110. When the provisioning engine 205 receives a request related to an asset 200, it may call on one or more manager components to assess the asset and the requesting entity to provide the provisioning engine 205 with the information required to apply appropriate security controls and provisioning based on an asset's security domain. In one embodiment, decisions regarding the security domain and provisioning thereof may generally be applied according to pre-defined business rules or policies regarding the asset and requesting entity. Such policies may be stored within a database or file.

On receiving a request 200, the provisioning engine 205 may invoke a risk manager 210 in order to ensure that the connection from which the request 200 has originated is not a risk to the enterprise 150. For example, a risk manager 210 may examine the operating system of the requesting client to ensure that the latest software patch has been applied. Patches are code components that are most often released by the manufacturer of hardware and/or software products to correct problems that were not recognized prior to release of the products. Further, the risk manager 210 may verify that the requesting client has anti-virus software and that the most recent patch level has been installed. In today's computing environment where security is critical, patches are often released to reduce a computer system's vulnerability to malicious code. Computing systems that do not have the appropriate protection can inadvertently and unknowingly download such malicious code, otherwise known as worms, viruses and attacks. Subsequent connections with other computing systems may result in "infection" of those systems by the affected computer.

The risk manager 210 may report information regarding the "health" of the requesting client to a connection manager 225 which may contain connection policies defining which connections to allow, limit, or decline. If the information from the risk manager 210 indicates that the appropriate patches and/or virus protection are absent from the connecting client, the connection manager 225 may provide the requesting client a link to a website, for example, where they may download the required patches and/or virus protection software. A requesting client not conforming to the security policies of the connection manager 225, may be restricted from accessing an asset until the appropriate patch and or software has been installed on the client's computer.

The provisioning engine 205 may invoke a policy manager 215 in order to evaluate the nature of the requested asset. The policy manager 215 may evaluate information contained in an asset request in order to determine workload allocation decisioning. Based on this determination, policy information may be provided to determine the appropriate controls to apply to an asset. Such controls may comprise requirement definitions relating to authentication, authorization, confidentiality, integrity, availability and the like. For example, a policy manager may apply controls to determine whether an application requires firewall services or intrusion detection services. In one embodiment, such controls may be encoded in XML and acted upon by a policy enforcement aspect of the policy manager 215.

A configuration manager 220 may be invoked by the provisioning engine 205 to determine what a server might restrict with regard to which services are available. For example, in a more secure environment, the configuration manager 220 may instruct the provisioning engine 205 to disable all services except for those which are absolutely necessary. A provisioning engine 205 may provision services to an asset based on input from a configuration manager 220 in light of an asset's security domain.

A recovery manager 230 may store rules and procedures regarding how requests are to be processed during resource downtime do to system failures or recovery efforts. For example, most enterprise computing environments are designed to include failsafe measures wherein if one system fails, there are one or more other systems capable of taking over the processing from the failed system. However, in the event of a catastrophic failure or a server failure during high traffic, there may not be sufficient backup processing capabilities to maintain business as usual. Therefore, decisions must be made as to what processes are critical and which are not. Non-critical processes may be terminated, while others may be directed to another processor. The recovery manager 230 may assess requests during such a failure in order to provide such input to the provisioning engine 205. The provisioning engine 205 may determine whether or not to allocate the requested resources for the asset based on its assigned security domain.

Several managers have been presented in FIG. 2, however practitioners will appreciate that there are any number of manager components that may assist the provisioning engine 205 in classifying an asset into a security domain. For example, the invention may further include a regulatory or compliance manager which may evaluate a request in order to determine if the request is related to FDIC requirements. A request for an asset based on regulatory rules or laws may be given special priority where limited computing resources exist.

Based on inputs from the manager components according to an asset's security domain, the provisioning engine 205 may assign varying levels of security controls and provisioning rules that apply to the asset. For example, if the asset represents sensitive information, such as unreleased earnings analysis, a provisioning engine 205 may require higher levels of authentication for the requesting entity. This could include adding an additional layer to the standard user ID and password authentication, such as requiring a smartcard or biometric data. According to various policies relating to the security domain, the provisioning engine 205 may transmit instructions to a systems provisioning tool 235. The systems provisioning tool 235 may control computing systems at the processor level allowing it to provision and de-provision system resources 240 in accordance with provisioning engine 205 instructions.

The various system components discussed herein may include one or more of the following: a server or other computing systems including a processor for processing digital data; a memory coupled to said processor for storing digital data; an input digitizer coupled to the processor for inputting digital data; an application program stored in said memory and accessible by said processor for directing processing of digital data by said processor; a display device coupled to the processor and memory for displaying information derived from digital data processed by said processor; and a plurality of databases. Various databases used herein may include: user data, debt data, income data, provider data; financial institution data; and/or like data useful in the operation of the present invention. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. user computer can be in a home or business environment with access to a network. In an exemplary embodiment, access is through a network or the Internet through a commercially-available web-browser software package.

As used herein, the term "network" shall include any electronic communications means which incorporates both hardware and software components of such. Communication among the parties in accordance with the present invention may be accomplished through any suitable communication channels, such as, for example, a telephone network, an extranet, an intranet, Internet, point of interaction device (point of sale device, personal digital assistant, cellular phone, kiosk, etc.), online communications, off-line communications, wireless communications, transponder communications, local area network (LAN), wide area network (WAN), networked or linked devices and/or the like. Moreover, although the invention is frequently described herein as being implemented with TCP/IP communications protocols, the invention may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, DILIP NAIK, INTERNET STANDARDS AND PROTOCOLS (1998); JAVA 2 COMPLETE, various authors, (Sybex 1999); DEBORAH RAY AND ERIC RAY, MASTERING HTML 4.0 (1997); and LOSHIN, TCP/IP CLEARLY EXPLAINED (1997) and DAVID GOURLEY AND BRIAN TOTTY, HTTP, THE DEFINITIVE GUIDE (2002), the contents of which are hereby incorporated by reference.

The various system components may be independently, separately or collectively suitably coupled to the network via data links which includes, for example, a connection to an Internet Provider (ISP) over the local loop as is typically used in connection with standard modem communication, cable modem, Dish networks, ISDN, Digital Subscriber Line (DSL), or various wireless communication methods. See, e.g., GILBERT HELD, UNDERSTANDING DATA COMMUNICATIONS (1996), hereby incorporated by reference. It is noted that the network may be implemented as other types of networks, such as an interactive television (ITV) network. Moreover, the system contemplates the use, sale or distribution of any goods, services or information over any network having similar functionality described herein.

The computers discussed herein may provide a suitable website or other Internet-based graphical user interface which is accessible by users, hosts or operators of the system. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, InterBase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, javaScript, active server pages (ASP), common gateway interface scripts (CGI), extensible markup language (XML), dynamic HTML, cascading style sheets (CSS), helper applications, plug-ins, and the like. A server may include a web service which receives a request from a web server, the request including a URL (http://yahoo.com/stockquotes/ge) and an IP address (123.56.789). The web server retrieves the appropriate web pages and sends the data or applications for the web pages to the IP address. Web services are applications which are capable of interacting with other applications over a communications means, such as the Internet. Web services are typically based on standards or protocols such as XML, SOAP, WSDL and UDDI. Web services methods are well known in the art, and are covered in many standard texts. See, e.g., ALEX NGHIEM, IT WEB SERVICES: A ROADMAP FOR THE ENTERPRISE (2003), hereby incorporated herein by reference.

The present invention may be described herein in terms of functional block components, screen shots, optional selections and various processing steps. It should be appreciated that such functional blocks may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as javaScript, VBScript or the like. For a basic introduction of cryptography and network security, the following may be helpful references: (1) "Applied Cryptography: Protocols, Algorithms, And Source Code In C," by Bruce Schneier, published by John Wiley & Sons (second edition, 1996); (2) "Java Cryptography" by Jonathan Knudson, published by O'Reilly & Associates (1998); (3) "Cryptography &

Network Security: Principles & Practice" by William Stallings, published by Prentice Hall; all of which are hereby incorporated by reference.

Each participant in the present invention may be equipped with a computing device in order to interact with the system and various assets. As previously described, the external client 105 and internal client 110 may each have a computing unit in the form of a personal computer, although other types of computing units may be used including laptops, notebooks, hand held computers, set-top boxes, cellular telephones, touch-tone telephones and the like. In one embodiment, the internal client may have a computing unit implemented in the form of a computer-server, although other implementations are contemplated by the invention. The enterprise 150 computing center as shown may comprise one or more mainframe computers. However, the enterprise 150 computing center may be implemented in other forms, such as a mini-computer, a PC server, a network of computers located in the same of different geographic locations, or the like. Moreover, the system contemplates the use, sale or distribution of any services or information over any network having similar functionality described herein.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Figure 3:
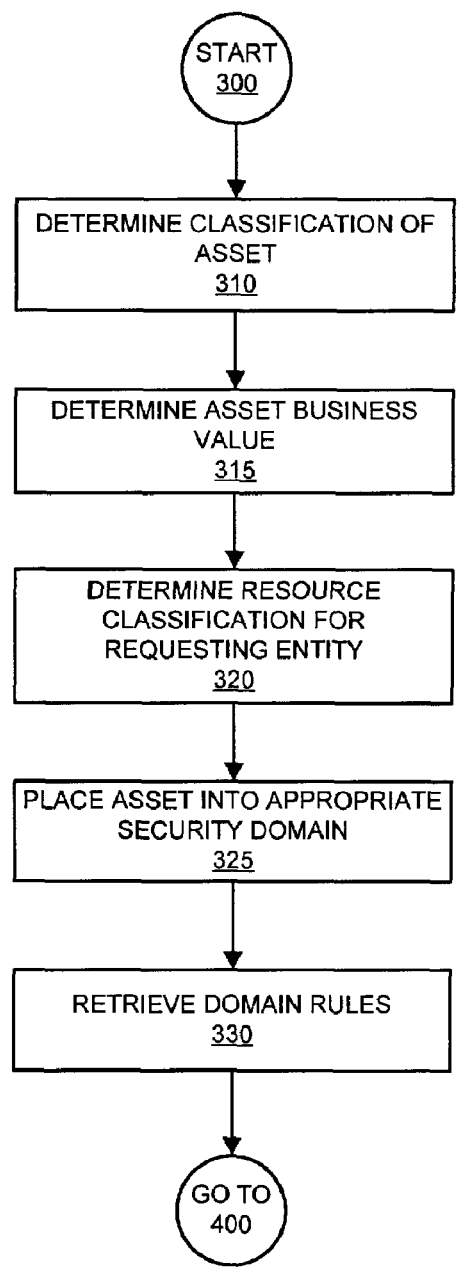
FIG. 3 is a flow chart illustrating an exemplary method for classifying an asset into an appropriate security domain; and, FIG. 4 is a flow chart illustrating an exemplary method for providing access to an asset and provisioning and/or de-provisioning computing and data resources.
Figure 4:
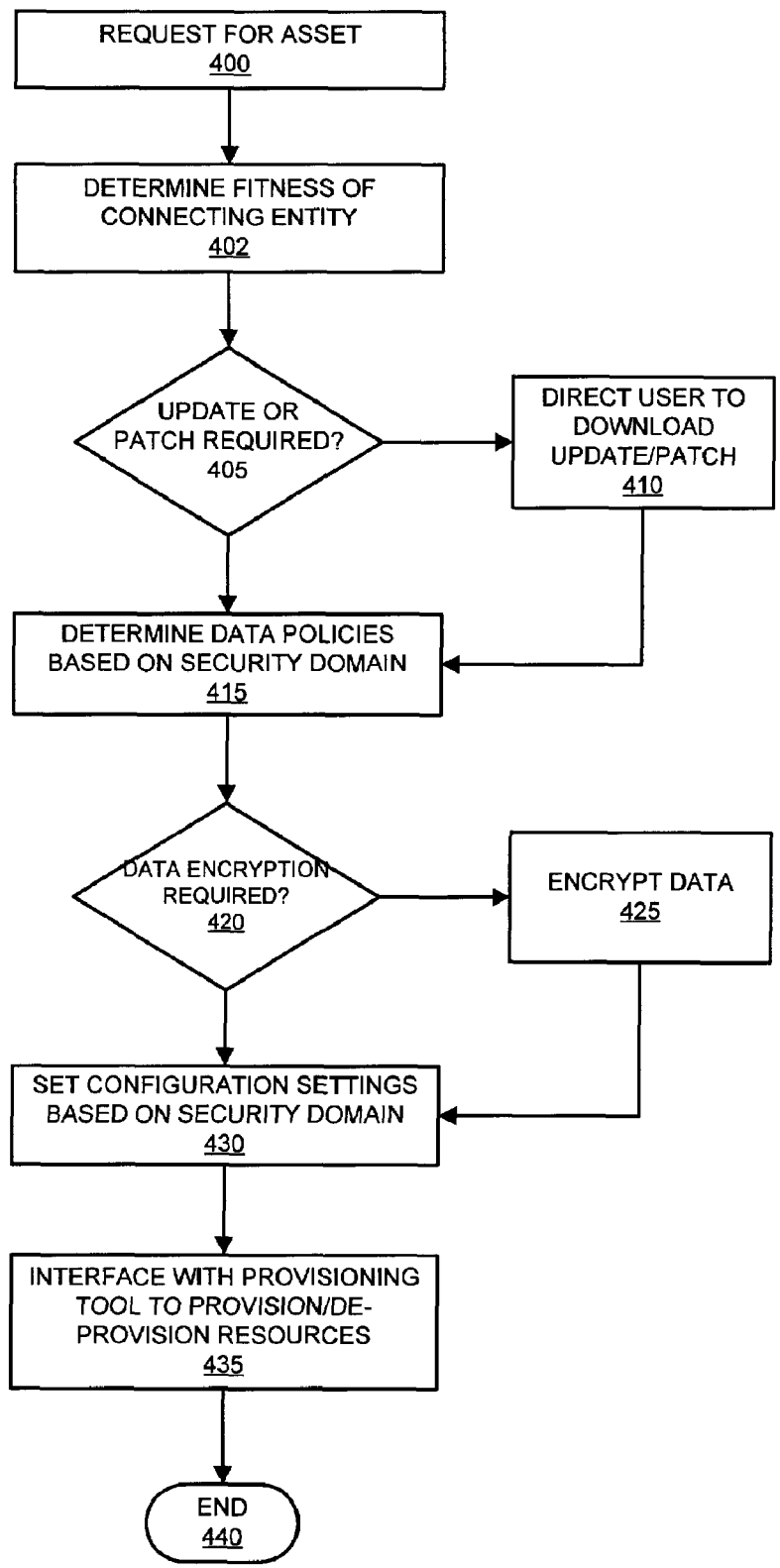

Referring now to FIGS. 3-4, the process flows depicted are merely exemplary embodiments of the invention and are not intended to limit the scope of the invention as described herein. For example, the steps recited in any of the method or process descriptions may be executed in any order and are not limited to the order presented. It will be appreciated that the following description makes appropriate reference to not only to the steps depicted in FIGS. 3-4, but also to the various system components as described above with reference to FIGS. 1 and 2. Further, illustrations of the process flows and the descriptions thereof may make reference to user windows, webpages, websites, web forms, prompts, etc. Practitioners will appreciate that the illustrated steps described herein may comprise in any number of configurations including the use of windows, webpages, web forms, popup windows, prompts and the like. It should be further appreciated that the multiple steps as illustrated and described may be combined into single webpages and/or windows but have been expanded for the sake of simplicity. In other cases, steps illustrated and described as single process steps may be separated into multiple webpages and/or windows but have been combined for simplicity.

FIG. 3 is a flow chart illustrating an exemplary method for classifying an asset and assigning it to an appropriate security domain. A classification of an asset may include, for example, whether the asset is public in nature, business confidential, private or secret. Such classification of an asset may determine what levels of security to apply to the asset as well as whether encryption of data may be required.

A second tier of information regarding an asset may comprise a business value (step 315). An asset's business value may relate to the value the asset provides in relation to it's utility. For example, a data asset relating to product information which is included within a company's website, may be assigned a business value that is lower than a value assigned to data relating to accounts payable. An asset business value may be thought of in terms of, what will the resultant loss in terms of revenue and reputation if an asset is lost? For example, if a credit card issuer cannot provide it's customers with an online option to pay their credit card bills due to a temporary loss of an account data asset, it may experience a minor loss in customer loyalty. However, if the credit card issuer experiences a loss in a purchase authorization asset, the issuer may experience a significant loss in revenue along with a possible loss of customers. Therefore, determining an asset business value (step 315) may be important in situations where a provisioning engine 105 must determine which assets will receive provisioning priority when resources are limited.

A third tier relating to an asset may comprise a resource classification for the requesting entity (step 320). A requesting entity may be a user or another software and/or hardware component. A resource classification may be used by the provisioning engine 105 to determine what security controls to apply to an asset. For example, an internal client 110 may be considered a trusted entity, and therefore, the internal client is only required to enter a user ID and password. An external client 105 may be considered a non-trusted entity and additional security indices may be required, such as name, address, telephone number and the like. Decisioning based on a requesting entity, for example, may be determined by the originating access channel or by a digital certificate proving the source is legitimate and is from a trusted source.

Based on multi-dimensional decision criteria (i.e. classification of an asset, asset business value and resource classification), an asset may be placed into an appropriate security domain (step 325). Further, the multi-dimensional decision criteria may help to ensure that assets are placed with security domains providing varying levels of security controls according to domain rules which may be retrieved from a database or defined within a policy manager (step 330). Based on an assets security domain, the provisioning engine 130 may further call on various managers in order to process the request appropriately. For example, a manager may determine a geographical source or location where a transaction request originated and based on this information, determine appropriate patches and privacy rules that are applicable to the request's location.

FIG. 4 is a flow chart illustrating an exemplary method for providing access to computing assets and provisioning and de-provisioning computing and/or data resources. A request for an asset (step 400) may be transmitted from a server to the provisioning engine 130. A request may comprise information such as, for example, a source ID and/or digital certificate from the requesting computer, transaction type, asset level, classification level, workload priority, workload volume, process time duration and the like. Prior to allowing a connecting client access to a computing resource, a provisioning engine 130 may invoke a connection manager 210 to determine the fitness of the connecting entity (step 402). In order to reduce the risk of infecting and damaging enterprise resources with malicious code (i.e. bugs and viruses), a risk manager 210 may evaluate the connecting client in order to verify that appropriate patches and/or antivirus software is detected. If a risk manager 210 detects that the "health" of a connecting client is not in accordance with pre-determined policy or that a software update or patch is required (step 405), the connection manager 225 may direct a user to download a software update and/or patch (step 410).

If the appropriate software and/or patch has been downloaded and installed (step 410) within the connecting client, and/or if the connecting client was found to be compliant with risk manager 210 requirements, the provisioning engine 130 may invoke a policy manager 215 to determine which data policies to apply to an asset based on its security domain. For example, if during the classification of an asset (FIG. 3, step 310) it is determined that the asset relates to private or secret information, then the provisioning engine 130 may require the asset to be encrypted. If it is determined that an asset requires data encryption (step 420), then the provisioning engine may invoke an encryption procedure (step 425).

The provisioning engine 130 may invoke a configuration manager 220 in order to set asset configuration settings based on its security domain (step 430). Configuration settings may maintain appropriate settings regarding which services a server may restrict. For example, if the asset is in a security domain indicative of a very critical asset, the configuration manager 220 may instruct the provisioning engine 130 to turn off all services that are not absolutely necessary. This may ensure that the asset has all of the resources necessary. When the asset lifecycle has expired, previously restricted services may be reinstated.

Following retrieval of settings from the various manager components, the provisioning engine 130 may interface with a provisioning tool 235 in order to provision and/or de-provision resources (step 435). As previously described, a provisioning tool 235 may comprise any commercially available resource allocation or load-balancing tool. The provisioning tool may be thought of as a switching station. The provisioning tool 235 may be configured to receive instructions and act accordingly without applying it's own logic, thereby relying on provisioning and de-provisioning instructions as received by the provisioning engine 130. When resources have been provisioned in compliance with the asset's security domain, the provisioning process may be complete (step 440).

The steps as recited above and illustrated in FIGS. 3 and 4 provide a sample process flow for an exemplary embodiment for dynamic provisioning, practitioners will appreciate the steps may be executed in any order. Additionally, other steps and additional parameters could be added to the process while others may be removed without departing from the spirit of the invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as critical, required, or essential features or elements of any or all the claims. As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

It should be understood that the detailed description and specific examples, indicating exemplary embodiments of the present invention, are given for purposes of illustration only and not as limitations. Many changes and modifications within the scope of the instant invention may be made without departing from the spirit thereof, and the invention includes all such modifications. Corresponding structures, materials, acts, and equivalents of all elements in the claims below are intended to include any structure, material, or acts for performing the functions in combination with other claim elements as specifically claimed. The scope of the invention should be determined by the appended claims and their legal equivalents, rather than by the examples given above.

What is claimed is:

1. A method comprising:
receiving, by a computer based system for dynamically load balancing hardware data resources, a request for hardware data resource processing, wherein the processing is according to a characteristic of data to be processed and a characteristic of said hardware data resource;
receiving, by said computer based system, data to be processed by said hardware data resources;
identifying, by said computer based system, a category of said data;
determining, by a computer based system, a business value of said data based on said category;
assigning, by said computer based system, said data to at least one of a plurality of security domains, wherein each security domain respectively includes a different degree of security control;
determining, by a computer based system, a subset of hardware data resources having capacity to process data;
analyzing, by said computer system, health of said hardware data resources having capacity to process data, wherein said health is based on said hardware data resources comprising at least one of current security patches and virus protection;
load balancing, by said computer system, the processing of said data among said hardware data resources having capacity to process data based on said business value, said health of said hardware data resource and said security domain assigned to said data, wherein said hardware data resources processes said data into processed data, wherein said load balancing is a process comprising a data processing request being spread throughout a network to combat individual hardware data resources from becoming overwhelmed by traffic;
receiving, by said computer based system, processed data from said hardware data resource;
applying, by said computer based system, a first level of encryption to said processed data in response to said business value being low;
applying, by said computer based system, a second level of encryption to said processed data in response to said business value being medium; and
applying, by said computer based system, a third level of encryption to said processed data in response to said business value being high.

2. The method of claim 1, wherein said hardware data resource resides within a shared storage environment.

3. The method of claim 1, further comprising assigning, by said computer based system, said data to at least one of a plurality of security domains, wherein each security domain respectively includes a different degree of security control.

4. The method of claim 1, further comprising assigning, by said computer based system, said data to at least one of a plurality of security domains based on an outcome of said determining.

5. The method of claim 1, further comprising de-provisioning, by said computer based system, said hardware data resource.

6. The method of claim 1, further comprising de-provisioning, by said computer based system, said hardware data resource when hardware said data resource is no longer needed by said data.

7. The method of claim 1, further comprising verifying, by said computer based system, a software inventory of at least one of: an internal client and an external client.

8. The method of claim 1, further comprising defining, by said computer based system, which processes may be suspended in response to said data requiring an additional hardware data resource.

9. The method of claim 1, further comprising storing, by said computer based system, policies regarding processing data when hardware data resources are limited due to a failure of at least one of: software and hardware.

10. The method of claim 1, further comprising determining, by said computer based system, a geographical source from which said request for said hardware data resource originates and applying at least one of a patch and a privacy rule based on said geographic location.

11. The method of claim 1, further comprising determining, by said computer based system, a data classification of said data, wherein said data classification is at least one of: a public data, a business confidential data, a private data, and a secret data.

12. The method of claim 1, further comprising determining, by said computer based system, a hardware data resource classification related to said data, wherein said hardware data resource classification is one of: a trusted classification for internal entities and a non-trusted classification for external entities.

13. The method of claim 1, wherein said load balancing prioritizes requests for hardware data resources according to said classification associated with each request such that said request having a higher business value receives a higher priority than said request having a lower business value.

14. The method of claim 1, wherein said business value of said processed data is one of a low value, a medium value, and a high value.

15. The method of claim 1, further comprising, determining, by said computer based system, an asset classification of said data, wherein said asset classification is at least one of: public data, business confidential data, private data, and secret data.

16. The method of claim 15, further comprising, dynamically assigning, by said computer based system, said processed data to one of a plurality of security domains based on at least one of a source of said request, said asset classification, and said business value, wherein each security domain corresponds to a different degree of security control.

17. A tangible non-transitory computer-readable storage medium having computer-executable instructions stored thereon that, if executed by a computer based system for dynamically load balancing hardware data resources, cause said computer based system to perform operations comprising:

receiving, by said computer based system, a request for hardware data resource processing, wherein the processing is according to a characteristic, of data to be processed and a characteristic of said hardware data resource;

receiving, by said computer based system, data to be processed by said hardware data resources;

identifying, by said computer based system, a category of said data;

determining, by said computer based system, a business value of said data based on said category;

determining, by said computer based system, a subset of hardware data resources having capability to process data;

analyzing, by said computer based system, health of said hardware data resources having capability to process data, wherein said health is based on said hardware data resources comprising at least one of current security patches and virus protection;

load balancing, by said computer based system, the processing of said data among said hardware data resources having capability to process data based on said business value and said health of said hardware data resource, wherein said hardware data resource processes said data into processed data, wherein said load balancing is a process comprising a data processing request being spread throughout a network to combat individual hardware data resources from becoming overwhelmed by traffic;

receiving, by said computer based system, processed data from said hardware data resource;

applying, by said computer based system, a first level of encryption to said processed data in response to said business value being low;

applying, by said computer based system, a second level of encryption to said processed data in response to said business value being medium; and applying, by said computer based system, a third level of encryption to said processed data in response to said business value being high.

18. A system for dynamically load balancing hardware data resources comprising:

a network interface communicating with a memory;

said memory communicating with a processor; and said processor, when executing a computer program, is configured to:

receive, by said processor, a request for hardware data resource processing, wherein the processing is accordion to a characteristic of data to be processed and a characteristic of said hardware data resource;

receive, by said processor, data to be processed by said hardware data resources identify, by said processor, a category of said data;

determine, by said processor, a business value of said data based on said category;

determine, by said processor, a subset of hardware data resources having capacity to process data:

analyze, by said processor, health of said hardware data resources having capacity to process data, wherein said health is based on said hardware data resources comprising at least one of current security patches and virus protection;

load balance, by said processor, the processing of said data among said hardware data resources having capacity to process data based on said business value of said data and said health of said hardware data resource wherein said hardware data resource processes said data into processed data, wherein said load balancing is a process comprising a data procession request being spread throughout a network to combat individual hardware data resources from becoming overwhelmed by traffic;

receive, by said processor, processed data from said hardware data resource;

apply, by said processor, a first level of encryption to said processed data in response to said business value being low;

apply, by said processor, a second level of encryption to said processed data in response to said business value being medium; and apply, by said processor, a third level of encryption to said processed data in response to said business value being high.

\* \* \* \* \*

UNITED STATES PATENT AND TRADEMARK OFFICE
CERTIFICATE OF CORRECTION

| | |
|---|---|
| PATENT NO. | : 8,266,670 B1 |
| APPLICATION NO. | : 10/905118 |
| DATED | : September 11, 2012 |
| INVENTOR(S) | : Mark Merkow et al. |

It is certified that error appears in the above-identified patent and that said Letters Patent is hereby corrected as shown below:

In Column 18 Lines 48-49, delete "accordion" and insert therefor --according--.

In Column 19 Line 2, delete "procession" and insert therefor --processing--.

Signed and Sealed this
Thirtieth Day of October, 2012

David J. Kappos
*Director of the United States Patent and Trademark Office*